Figure 6:
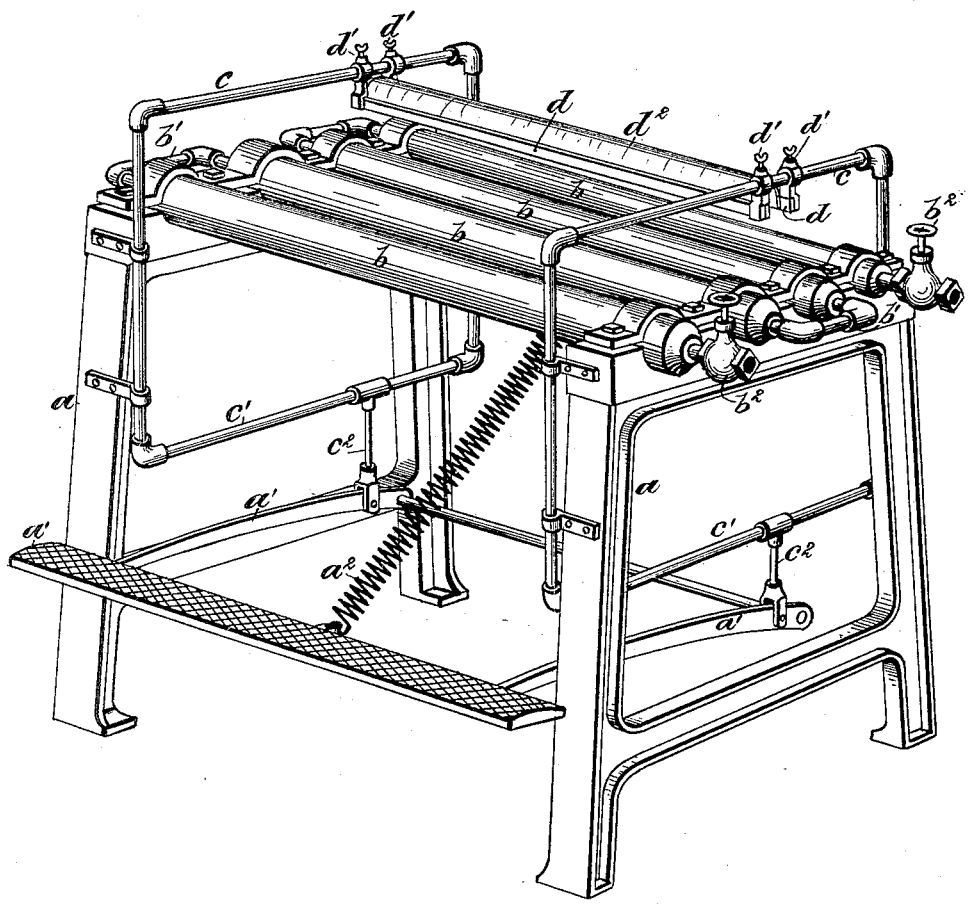

(No Model.) 4 Sheets—Sheet 1.
E. P. DONNELL & J. MILLS.
MACHINE FOR MANUFACTURING BACKS FOR BLANK BOOKS.
No. 433,235. Patented July 29, 1890.
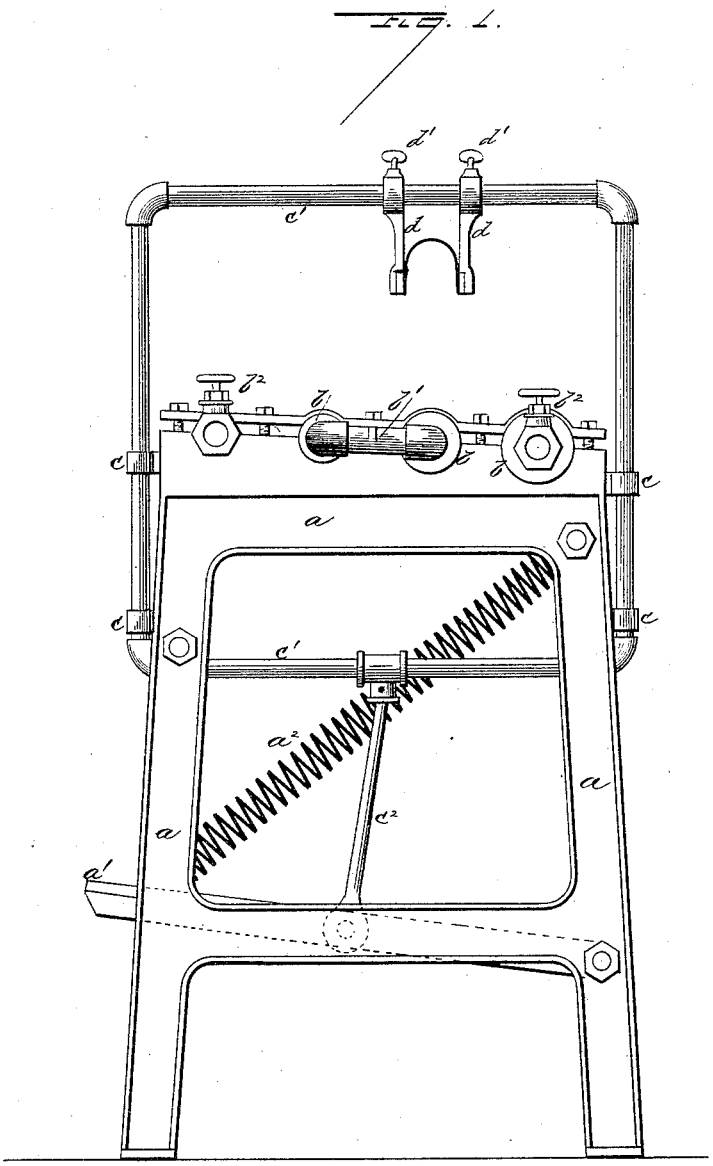

(No Model.) 4 Sheets—Sheet 2.
E. P. DONNELL & J. MILLS.
MACHINE FOR MANUFACTURING BACKS FOR BLANK BOOKS.
No. 433,235. Patented July 29, 1890.
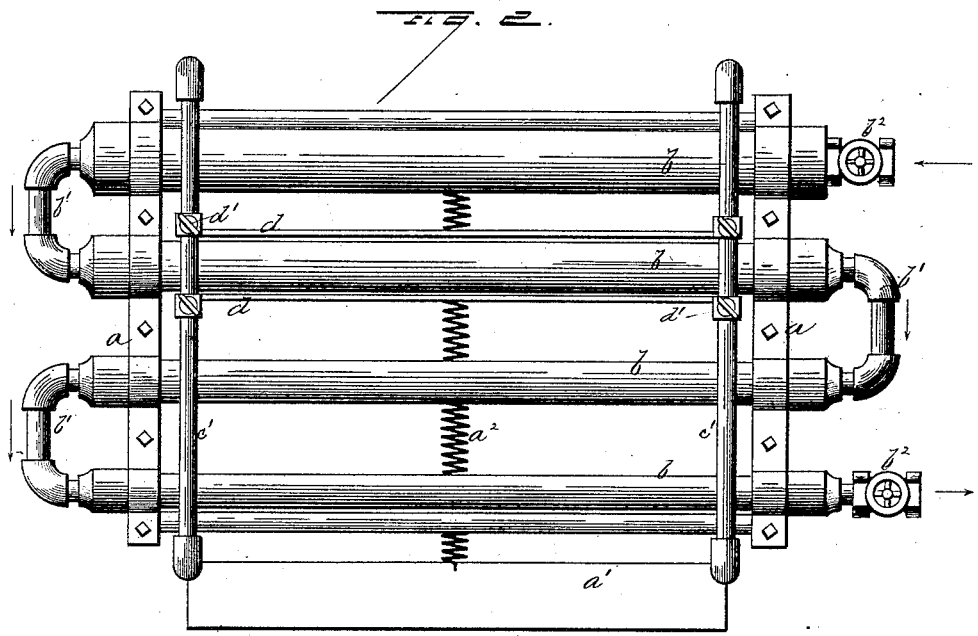
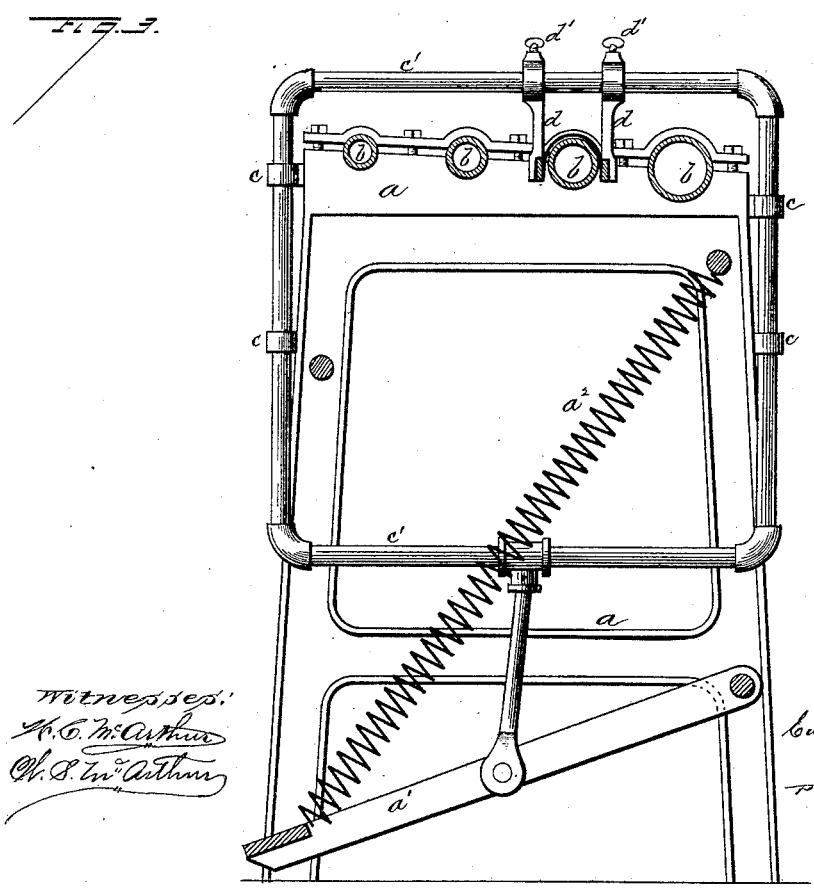

(No Model.) 4 Sheets—Sheet 3.
E. P. DONNELL & J. MILLS.
MACHINE FOR MANUFACTURING BACKS FOR BLANK BOOKS.
No. 433,235. Patented July 29, 1890.
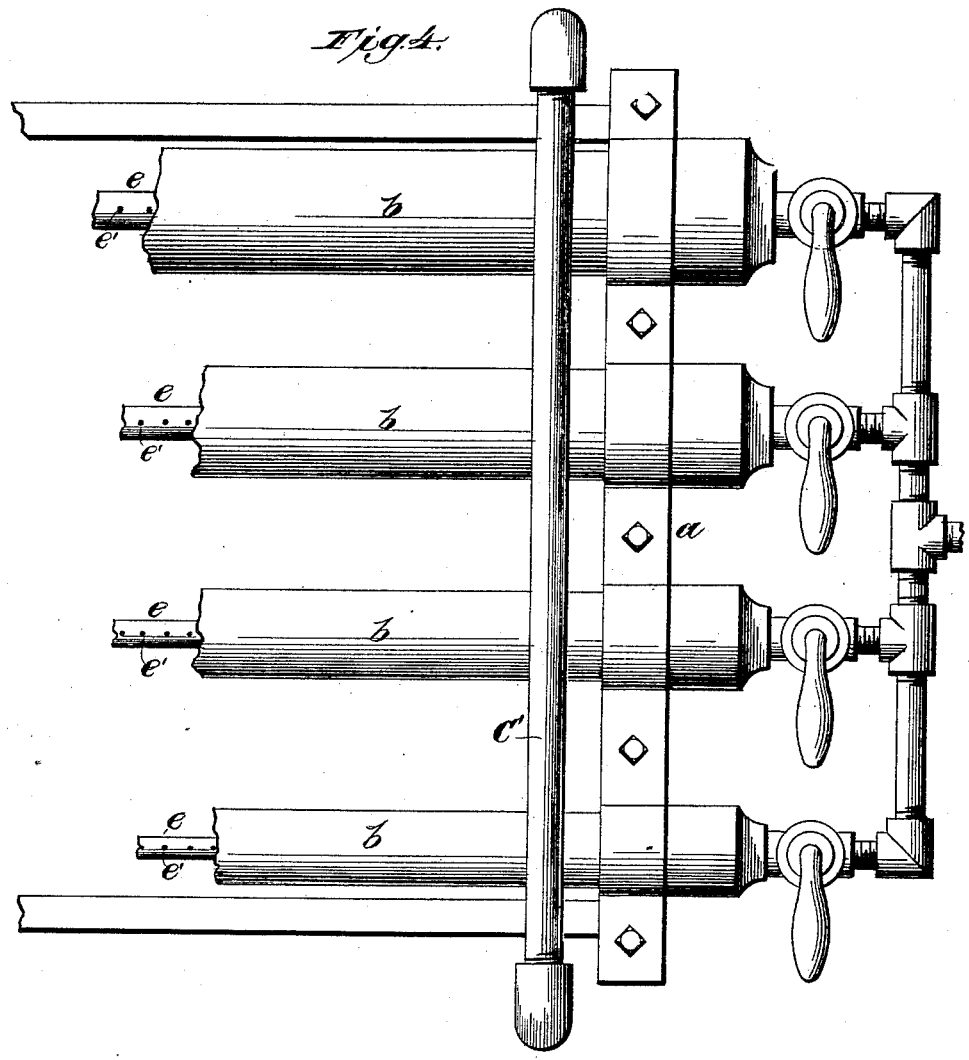
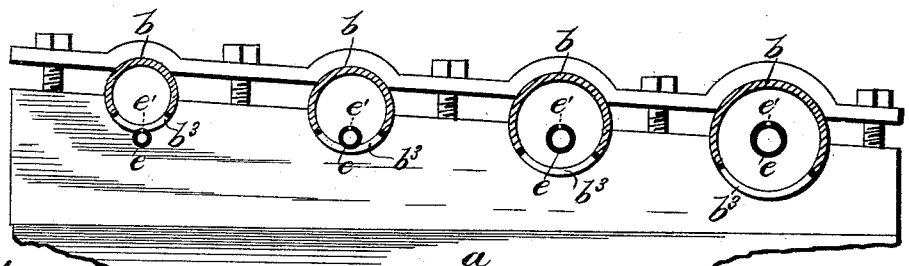

(No Model.) 4 Sheets—Sheet 4.

E. P. DONNELL & J. MILLS.
MACHINE FOR MANUFACTURING BACKS FOR BLANK BOOKS.

No. 433,235. Patented July 29, 1890.

UNITED STATES PATENT OFFICE.

EDWARD P. DONNELL AND JOHN MILLS, OF CHICAGO, ILLINOIS.

MACHINE FOR MANUFACTURING BACKS FOR BLANK-BOOKS.

SPECIFICATION forming part of Letters Patent No. 433,235, dated July 29, 1890.

Application filed June 24, 1887. Serial No. 242,373. (No model.)

*To all whom it may concern:*

Be it known that we, EDWARD P. DONNELL and JOHN MILLS, citizens of the United States, residing at Chicago, in the county of Cook and State of Illinois, have invented certain new and useful Improvements in Machines for Manufacturing Backs for Blank-Books, of which the following is a specification, to wit:

This invention relates to an improvement in machines for molding backs for blank-books; and it consists in certain constructions of parts, substantially as will be hereinafter more fully set forth and claimed.

In order to enable others skilled in the art to which our invention pertains to make and use the same, we will now proceed to describe its construction and operation, referring to the accompanying drawings, in which—

Figure 1 is a side elevation of our machine. Fig. 2 is a plan view, and Fig. 3 a central vertical section, of the same arranged for the use of steam. Fig. 4 is a plan view of one end of the machine, and Fig. 5 a vertical section of the same, arranged for the use of gas. Fig. 6 is a perspective view of the machine, showing the molding-bars and flexible strip.

$a$ represents the main frame of our machine, which may be of any size and shape deemed suitable, and is provided with an operating-treadle $a'$, hinged in the lower part of the frame, and provided with a spring $a^2$ for returning it to place after it has been depressed.

Across the upper part of the machine are secured any suitable number of hollow cylindrical forms $b$ of various sizes, over which the book-backs are molded. These molds or forms must be heated, and we have shown in Figs. 1, 2, and 3 the means for heating them by steam. In this form the hollow molds are connected by a series of return-bends $b'$ to form a continuous steam-coil, and valves $b^2$ are placed at the inlet and outlet ends to control the supply of steam, and to these valves the supply and return pipes of the steam-connections are made from any suitable generator. (Not necessary to show herein.)

In suitable guides $c$, upon the main frame, run a pair of vertically-sliding frames $c'$, which are connected by links $c^2$ with the treadle, and upon these frames $c'$ are carried the molding-bars $d$, which are adjustable upon the frames by means of set-screws $d'$, and extend across the machine parallel with the hollow molds.

In use the steam-connections are made and the circulation of steam through the molds or forms heats them to the proper degree. The molding-bars are held normally above the cylindrical molds and are adapted to be adjusted backward and forward up and down, so as to properly fit any one of the series.

The material is dampened in the usual way and laid upon the mold, and the depression of the treadle at once causes the bar $d$ and the flexible strip $d^2$ to descend upon it, holding it closely upon the mold till the heat has thoroughly set it to proper form, and the pressure being then released the spring at once carries the whole device back to place and the operation is repeated, thus forming the "back" very accurately and far quicker than it can be done by hand.

In many cases steam is not available for heating the mold $b$, and in such cases we form the machine as in Figs. 4 and 5, in which the under part of the cylindrical mold is cut away on the under side, as at $b^3$, and a gas-pipe $e$, having the perforations $e'$, is extended below it parallel to its length. It is evident that by lighting the gas in the jets or perforations $e'$, and regulating the flow of gas by the ordinary stop-cock in the main pipe, any one of the molds $b$ can be given a gradual heat, while the gas is supplied with air by the space around the pipe $e$.

The position of the gas-pipes with respect to the molds is more particularly shown in section in Fig. 5, where it will be seen that the largest size mold has the gas-pipe concentric therewith, while with the smallest size the gas-pipe is placed below in order that combustion may be uninterrupted.

It will be noticed that the molding-bars $d$ are connected their entire length by a strip of flexible material $d^2$—such as canvas, felt, asbestus, or other material of suitable strength and flexibility—and when these bars are depressed their flexible connection bears firmly upon all parts of the blank under operation and holds it in close contact with the cylindrical heated mold till properly set and formed.

Having thus fully described our invention, what we claim as new, and desire to secure by Letters Patent, is—

1. In a machine for molding the backs of blank-books, the combination, with a cylindrical heated mold, of a sliding molding-bar for pressing the material over the face of the mold, substantially as and for the purpose set forth.

2. The combination, with the main frame provided with a cylindrical heated mold, of a pair of sliding frames, a pair of molding-bars thereon, and a flexible strip for pressing the material around the mold, substantially as and for the purpose set forth.

3. The combination, with a series of cylindrical heated molds of varying size, of a pair of frames sliding to and from the molds, and a pair of bars upon said frames adjustable to suit any one of the series of molds, and a flexible strip connecting said bars, substantirlly as and for the purpose set forth.

4. The combination, with the main frame and a pair of sliding frames having a pair of adjustable pressure-bars connected by a flexible strip, of a series of hollow molds of various sizes and connections from one to the other to permit a steam circulation through them, substantially as and for the purpose set forth.

5. The combination, with the hollow heated mold, of the bars $d$, movable to and from the same and connected by a strip of flexible material, substantially as and for the purpose set forth.

In testimony whereof we affix our signatures in presence of two witnesses.

EDWARD P. DONNELL.
    JOHN MILLS.

Witnesses:
 W. C. McArthur,
 W. S. McArthur.